US012572161B2

(12) United States Patent　　　(10) Patent No.:　US 12,572,161 B2

Olip et al.　　　　　　　　　　(45) Date of Patent:　Mar. 10, 2026

(54) METHOD AND CONTROL DEVICE FOR CONTROLLING A ROTATIONAL SPEED

(71) Applicant: AVL List GmbH, Graz (AT)

(72) Inventors: Horst Olip, Graz (AT); Georg Abler, Bürmoos (AT); Maximilian Bier, Darmstadt (DE)

(73) Assignee: AVL List GmbH, Graz (AT)

( * ) Notice: Subject to any disclaimer, the term of this patent is extended or adjusted under 35 U.S.C. 154(b) by 766 days.

(21) Appl. No.: 17/438,405

(22) PCT Filed: Mar. 11, 2020

(86) PCT No.: PCT/EP2020/056521

§ 371 (c)(1),
(2) Date: Sep. 10, 2021

(87) PCT Pub. No.: WO2020/182895

PCT Pub. Date: Sep. 17, 2020

(65) Prior Publication Data

US 2022/0155803 A1　　　May 19, 2022

(30) Foreign Application Priority Data

Mar. 11, 2019　(AT) ............................... A 50198/2019

(51) Int. Cl.
G05D 13/62　　　　(2006.01)
G01M 17/007　　　(2006.01)
(Continued)

(52) U.S. Cl.
CPC .......... G05D 13/62 (2013.01); G01M 17/007 (2013.01); G06F 17/00 (2013.01); G06F 17/40 (2013.01)

(58) Field of Classification Search
CPC .. G01M 13/025; G01M 17/007; G01M 13/02; G05B 11/01; G05B 19/416;
(Continued)

(56) References Cited

U.S. PATENT DOCUMENTS 5,916,501 A * 6/1999 Hehl ....................... B29C 45/77
　　　　　　　　　　　　　　　　　　425/149
7,088,064 B2 8/2006 Brakelmann et al.
(Continued)

FOREIGN PATENT DOCUMENTS

CN　　102033553 A　　4/2011
DE　　3932214 A1　　4/1991
(Continued)

OTHER PUBLICATIONS

Stegmaier, Nicolas "Regelung von Antriebsstrangprüfständen" Wissenschaftliche Reihe Fahrzeugtechnik Universität Stuttgart, Springer Vieweg, Oct. 24, 2018 <URL: https://azpdf.tips/regelung-von-antriebsstrangprfstnden-pdf-free.html> DOI 10.1007/978-3-658-24270-1.

*Primary Examiner* — Lisa M Caputo
*Assistant Examiner* — Joshua L Forristall
(74) *Attorney, Agent, or Firm* — Dykema Gossett PLLC

(57) ABSTRACT

Various aspects of the present disclosure are directed to, for example, methods of controlling a rotational speed of a maching. In one example embodiment, the method includes the steps of: generating a rotational speed reference variable for a controller from a rotational speed setpoint value; determining an adapted rotational speed setpoint value which considers a rotation angle actual value and a rotation angle setpoint value determined on the basis of the rotational speed setpoint value; and switching the rotational speed reference variable between the rotational speed setpoint value and the adapted rotational speed setpoint value as a function of the rotational speed.

18 Claims, 4 Drawing Sheets

(51) Int. Cl.
    *G06F 17/00*           (2019.01)
    *G06F 17/40*           (2006.01)

(58) Field of Classification Search
    CPC ........... G05B 2219/41419; G05B 2219/42194;
               G05D 13/62; G06F 17/00; G06F 17/40
    USPC ........................................................ 702/145
    See application file for complete search history.

(56)                References Cited

U.S. PATENT DOCUMENTS

| | | | |
|---|---|---|---|
| 8,245,570 B2 | 8/2012 | Pickl | |
| 2011/0246113 A1* | 10/2011 | Armbruster | G01D 18/001 |
| | | | 702/94 |
| 2018/0254723 A1* | 9/2018 | Miyako | H02P 6/20 |
| 2019/0195192 A1* | 6/2019 | Takahashi | F03D 1/06 |
| 2020/0007061 A1* | 1/2020 | Frischen | G01L 3/10 |
| 2021/0384856 A1* | 12/2021 | Testolin | H02P 1/46 |

FOREIGN PATENT DOCUMENTS

| | | |
|---|---|---|
| DE | 10040385 A1 | 3/2002 |
| JP | S62-217890 A | 9/1987 |
| JP | 2009-284676 A | 12/2009 |
| JP | 2010-271151 A | 12/2010 |
| JP | 2011-217598 A | 10/2011 |
| WO | 2011022746 A1 | 3/2011 |
| WO | 2011038429 A1 | 4/2011 |
| WO | 2011044607 A1 | 4/2011 |

* cited by examiner

METHOD AND CONTROL DEVICE FOR CONTROLLING A ROTATIONAL SPEED

CROSS-REFERENCE TO RELATED APPLICATIONS

This application is a national stage filing based upon International PCT Application No. PCT/EP2020/056521, filed 11 Mar. 2020, which claims the benefit of priority to Austria application No. A 50198/2019, filed 11 Mar. 2019.

BACKGROUND

The invention relates to a method for controlling a rotational speed of a machine, more particularly a load machine on a test bench, a rotational speed reference variable for a controller being generated from a rotational speed setpoint value. The invention further relates to a control arrangement for controlling the rotational speed of a machine, more particularly a load machine on a test bench.

In the case of classic rotational speed sensors (in particular incremental encoders), as are usually used in electrical load machines on the test bench, the measuring range around zero rpm and at exactly zero rpm is basically only insufficiently covered. Below a certain minimum rotational speed, the rotational speed-dependent deviation between the absolute value and the incremental signal can no longer be ignored. As a result, the poorly resolved rotational speed signal leads to control problems. The required control quality cannot be achieved. This problem of rotational speed control at low rotational speeds arises in the case of automotive test benches, in particular when tests are to be carried out from a standstill or at very low rotational speeds. The problem is also known from drive train test benches in which the load machine engages at wheel level. Since the increased introduction of electrified components (e.g. electric motors or hybrid drives), the problem increasingly also arises in the case of engine test benches.

The problem addressed by the present invention is that of improving the control system of the rotational speed of a machine with regard to its performance, even at rotational speeds close to zero or during control processes from or into a standstill.

SUMMARY OF THE INVENTION

According to the invention, these and other problems are solved by a method of the type mentioned at the outset, whereas an adapted rotational speed setpoint value is determined taking into consideration a rotation angle actual value and a rotation angle setpoint value determined on the basis of the rotational speed setpoint value, the rotational speed reference variable being switched between the rotational speed setpoint value and the adapted rotational speed setpoint value as a function of the rotational speed. As a result, at low rotational speeds, the rotational speed setpoint value for the control system can be adjusted as a function of how the controlled machine follows the ideal (angular) position over time. At higher rotational speeds, for example when the rotational speed sensor has a sufficiently high resolution, the control system switches to the conventional control method. The use of a position signal (i.e. angle signal) at low rotational speeds also has the advantage that, at a rotational speed setpoint value of zero rpm, the rotational speed cannot drift away due to the connection to the absolute value of the angle. The rotational speed at which the switching takes place is selected to be so high that the control system functions sufficiently well even without an adapted rotational speed setpoint value. In this range, no deviation of the rotation angle actual value from the rotation angle setpoint value is to be expected, such that no sudden changes in the rotational speed reference variable are to be expected when switching.

The switching can advantageously be carried out according to a switching characteristic curve having a preferably ramp-like transition phase, the speed reference variable in particular corresponding to a linear combination of the rotational speed setpoint value and the adapted rotational speed setpoint value in the transition phase. The ramp-like transition of the control system achieved in this way is advantageous for reasons of control stability and the occurrence of torque surges are prevented.

In a preferred embodiment, the adapted rotational speed setpoint value can be determined from a deviation of the rotation angle actual value from the rotation angle setpoint value. This can be achieved by means of a simple summing element in conjunction with corresponding signal processing.

The rotation angle setpoint value can advantageously be determined as an integrated and normalized value from the rotational speed setpoint value.

According to a further advantageous embodiment, the rotation angle actual value can be determined as a scaled and normalized value from a rotation angle raw signal. As a result, the rotation angle setpoint value and the rotation angle actual value can be correlated to one another in a simple manner.

In an advantageous embodiment, according to the invention, a rotational speed feedback variable of the control system can be switched between a general rotational speed measurement value and a high-resolution rotational speed measurement value as a function of the rotational speed. As a result of this feature, it is possible for the control accuracy to be increased further, since a high-resolution rotational speed measurement value is used in the range of low rotational speeds.

The switching can advantageously be carried out according to a switching characteristic curve having a preferably ramp-like transition phase, the rotational speed feedback variable in particular corresponding to a linear combination of the general rotational speed measurement value and the high-resolution rotational speed measurement value in the transition phase. This is used in turn for control stability and preventing torque surges.

The problems addressed by the invention are also solved by a control arrangement of the type mentioned at the outset, the control arrangement having an integrating element which determines a rotation angle setpoint value from a rotational speed setpoint value, an adapting element which, taking into consideration a rotation angle actual value and the rotation angle setpoint value, determines an adapted rotational speed setpoint value, and a setpoint value switching element which switches a rotational speed reference variable between the rotational speed setpoint value and the adapted rotational speed setpoint value as a function of the rotational speed. This control arrangement makes an advantageous implementation of the method disclosed above possible.

The setpoint value switching element can advantageously be designed to carry out the switching process as a function of a switching characteristic curve having a preferably ramp-like transition phase, in which the rotational speed reference variable is in particular determined as a linear combination of the rotational speed setpoint value and the adapted rotational speed setpoint value.

In an advantageous embodiment of the invention, the control arrangement can have an adapting element which determines the adapted rotational speed setpoint value from a deviation of the rotation angle actual value from a rotation angle setpoint value.

In a further advantageous embodiment, the control arrangement can have an integrating element which determines the rotation angle setpoint value as an integrated and standardized value from the rotational speed setpoint value.

According to a further advantageous embodiment, the control arrangement can have an angle signal processing element which determines the rotation angle actual value as a scaled and standardized value from a rotation angle raw signal.

The control device can advantageously have an actual value switching element which switches a rotational speed feedback variable of the control system between the general rotational speed measurement value and a high-resolution rotational speed measurement value as a function of the rotational speed.

In a further advantageous embodiment according to the invention, the actual value switching element can be designed to carry out the switching process as a function of a switching characteristic curve having a preferably ramp-like transition phase, in which the rotational speed feedback variable is in particular determined as a linear combination of the general rotational speed measurement value and the high-resolution rotational speed measurement value.

BRIEF DESCRIPTION OF THE DRAWINGS

In the following, the present invention is described in greater detail with reference to FIGS. 1 to 5 which, by way of example, show schematic and non-limiting advantageous embodiments of the invention. In the drawings.

DETAILED DESCRIPTION

Figure 1:
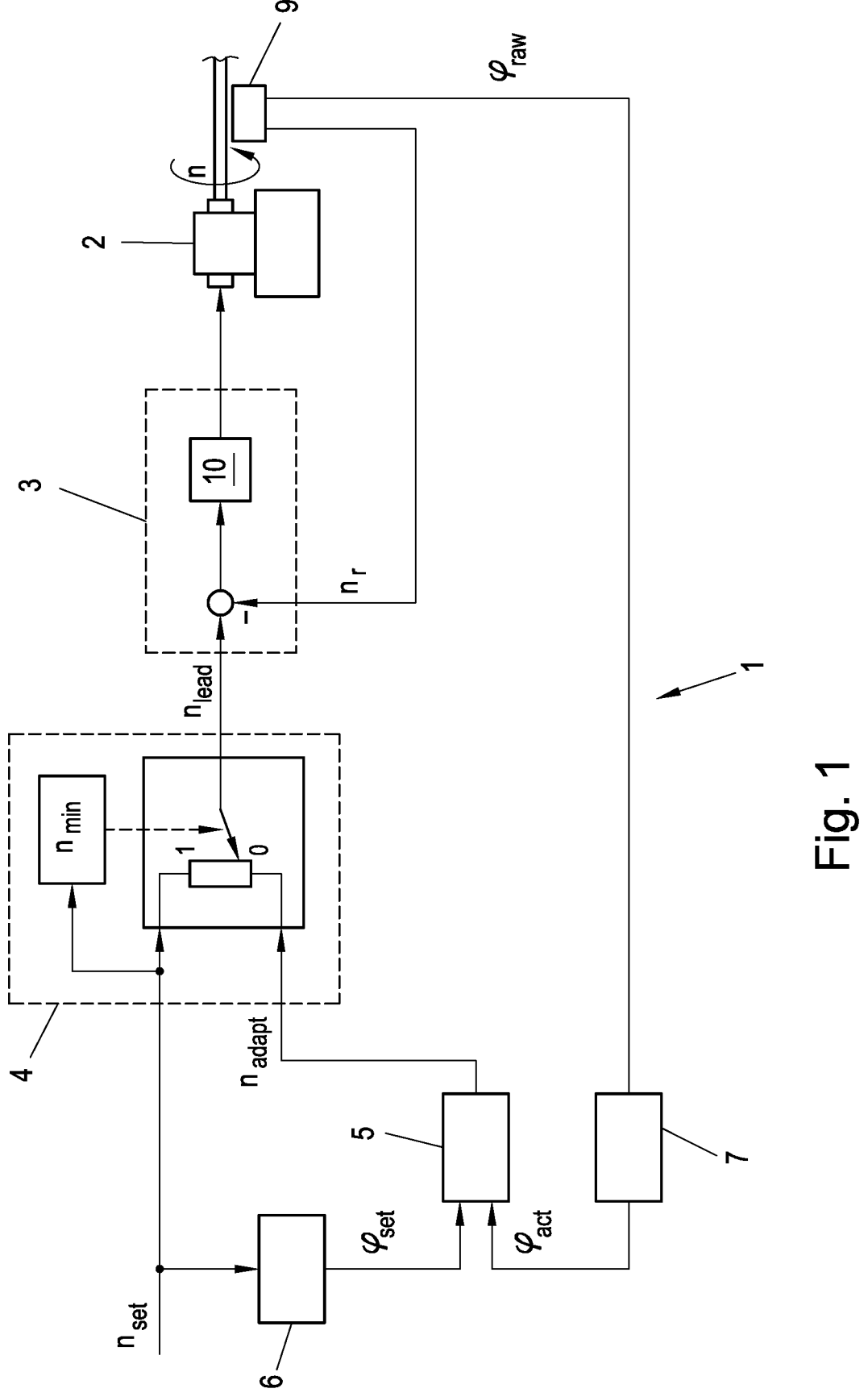
FIG. 1 is a schematic view of a control arrangement according to a first embodiment.

FIG. 1 shows the control system of a load machine 2 of a test bench, the load machine 2 being connected to a test object (not shown) via a shaft. The rotational speed n at which the shaft on the load machine 2 rotates is the controlled variable. The rotational speed n is measured by means of a sensor arrangement 9 and fed back to a controller 3 as a rotational to speed feedback variable $n_r$. In the controller 3, the deviation of the rotational speed feedback variable $n_r$ from a rotational speed reference variable $n_{lead}$ is determined and supplied as a control difference to a control element 10 which generates a manipulated variable for the load machine 2 in accordance with a defined control strategy.

During "normal" operation, i.e. above a certain minimum rotational speed $n_{min}$, the rotational speed reference variable $n_{lead}$ conventionally corresponds to a rotational speed setpoint value $n_{set}$, which is generated, for example, by a system controller or a simulation.

In the case of known control methods for load machines on test benches, there is a reduction in control quality at low rotational speeds n, in particular when accelerating from a standstill and decelerating to a standstill. In order to improve the control quality, according to the invention, the rotational speed reference variable $n_{lead}$ is therefore switched to an adapted rotational speed setpoint value $n_{adapt}$ by a setpoint value switching element 4, which is upstream of the controller 3, when the rotational speed n is below the minimum rotational speed $n_{min}$. In the case shown, the comparison with the minimum rotational speed $n_{min}$ is carried out on the basis of the rotational speed setpoint value $n_{set}$, but the comparison could also be carried out, for example, on the rotational speed feedback variable $n_r$. The adapted rotational speed setpoint value $n_{adapt}$ ensures a high and stable control quality, even in the slow rotational speed range. The minimum rotational speed $n_{min}$ is selected such that the critical ranges of low rotational speeds are completely covered and that switching takes place in a rotational speed range that is as uncritical as possible.

The adapted rotational speed setpoint value $n_{adapt}$ is formed by an adapting element 5 on the basis of a rotation angle evaluation, in which a rotation angle setpoint value $\varphi_{set}$ determined by an integrating element 6 from the rotational speed setpoint value $n_{set}$ is compared with a rotation angle actual value $\varphi_{act}$ determined on the basis of the sensor arrangement 9 (or a corresponding other measuring arrangement). By means of this adapted rotational speed setpoint value $n_{adapt}$, the rotational speed reference variable $n_{lead}$ is adjusted in the low rotational speed range as a function of how the load machine 2 follows its ideal (angular) position over time. The rotation angle actual value $\varphi_{act}$ is determined in the shown embodiment from a rotation angle raw signal $\varphi_{raw}$ measured by the sensor arrangement 9, whereas an angle signal processing element 7 generates the rotation angle actual value $\varphi_{act}$ in a form matching the rotation angle setpoint value $\varphi_{set}$ from the rotation angle raw signal $\varphi_{raw}$.

The use of a position signal (i.e. angle signal) prevents the problem of the resolution of the measured rotational speed signal (i.e. the signal on which the rotational speed feedback variable $n_r$ is based) being too low at low rotational speeds and also has the advantage that, in the case that a rotational speed setpoint value=0 rpm, the rotational speed cannot drift away due to the connection to the absolute value of the angle.

Figure 2:
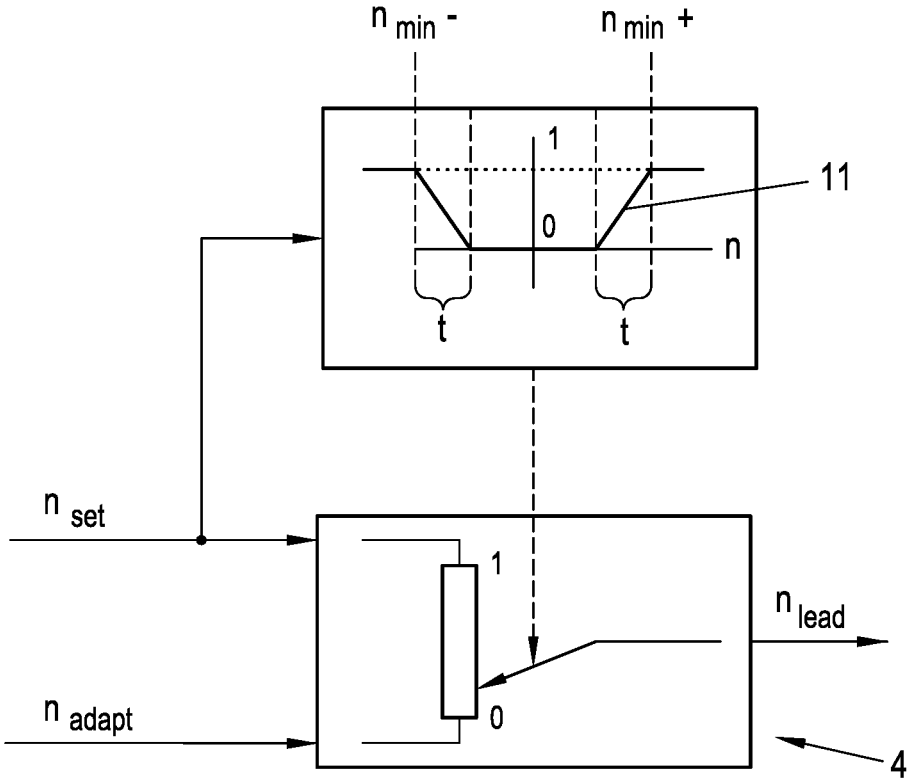
FIG. 2 is a block diagram of a setpoint value switching element of the control system according to an advantageous embodiment.

FIG. 2 shows an alternative embodiment of the setpoint value switching element 4. In this case, the rotational speed reference variable $n_{lead}$ is switched between the rotational speed setpoint value $n_{set}$ and the adapted rotational speed setpoint value $n_{adapt}$ according to a switching characteristic curve 11 which provides a ramp-like transition phase t. A minimum rotational speed $n_{min}$ is also defined in this case (both for a positive rotational direction $n_{min}^+$ and for a negative rotational direction $n_{min}^-$). At rotational speeds n, of which the absolute value is above the minimum rotational speed $n_{min}$, the setpoint value switching element 4 in turn uses the rotational speed setpoint value $n_{set}$ as the rotational speed reference variable $n_{lead}$. As soon as the absolute value of the rotational speed falls below the minimum rotational speed $n_{min}$, the setpoint value switching element 4 creates the rotational speed reference variable Read as a linear combination of the rotational speed setpoint value $n_{set}$ and the adapted rotational speed setpoint value $n_{adapt}$ within the transition phase t. If the absolute value of the rotational speed is below the transition phase, the adapted rotational speed setpoint value $n_{adapt}$ is used as the rotational speed reference variable $n_{lead}$.

Figure 3:
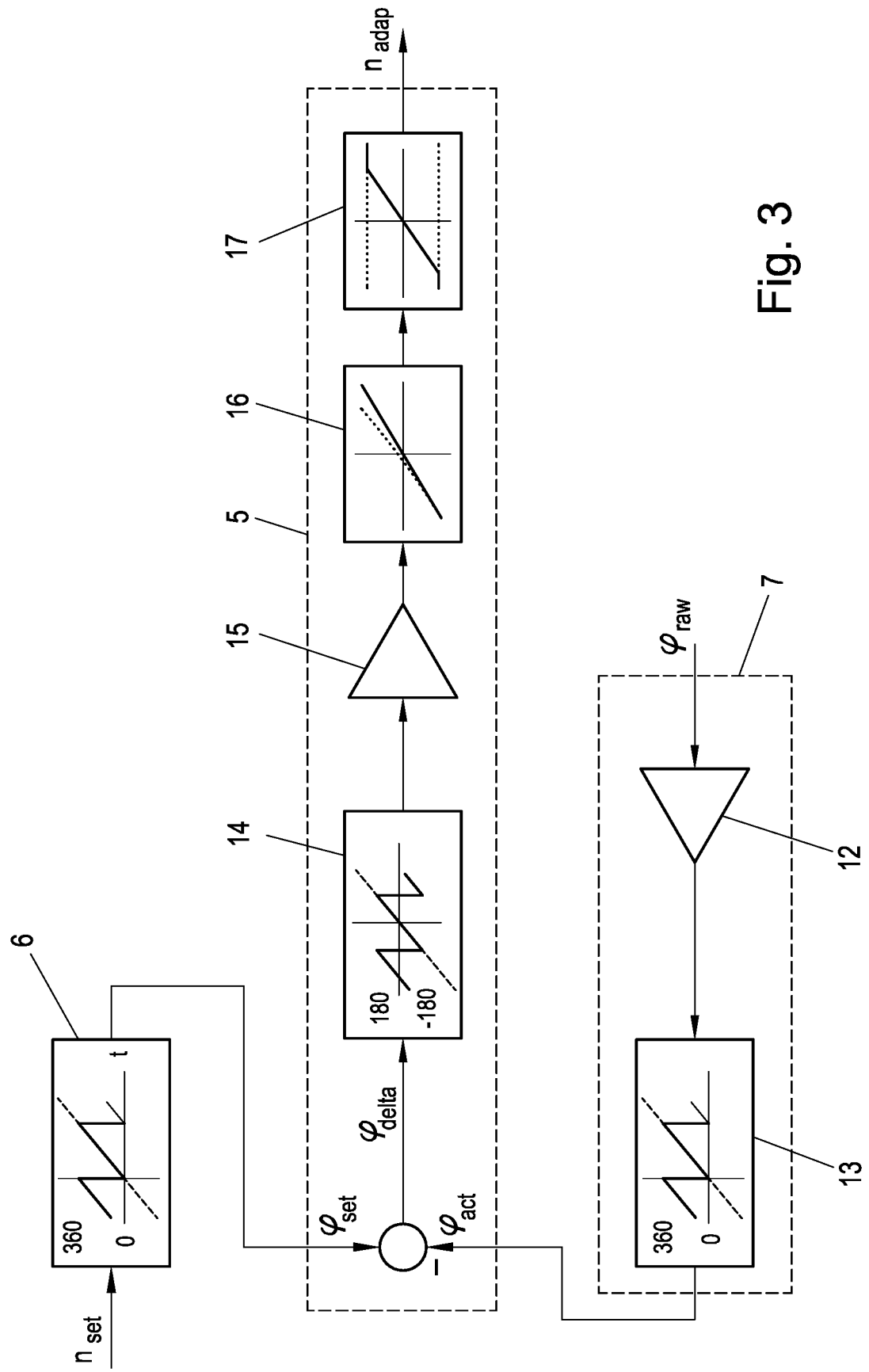
FIG. 3 is a block diagram of part of the control system in a more detailed view.

FIG. 3 shows an advantageous embodiment of part of the control system outlined in FIG. 1, the integrating element 6, the angle signal processing element 7, and the adapting element 5 being shown in greater detail. With reference to FIG. 3, the generation of the adapted rotational speed setpoint value $n_{adapt}$ will now be explained using this specific embodiment.

The integrating element 6 generates the rotation angle setpoint value $\varphi_{set}$ from the rotational speed setpoint value $n_{set}$ as an integrated value normalized to an angle range of between 0° and 360°. In order to be able to directly compare the rotation angle actual value (pad with this value, the rotation angle raw signal $\varphi_{raw}$ is scaled in the angle signal processing element 7 (scaling element 12) and also normalized to an angle range of between 0° and 360° in a normalizing element 13.

In the adapting element 5, a rotation angle difference $\varphi_{delta}$ is formed from the rotation angle setpoint value $\varphi_{set}$ and the rotation angle actual value $\varphi_{act}$. The rotation angle difference $\varphi_{delta}$ is normalized to an angle range of between −180° and +180° in a second normalizing element 14 and is amplified in an amplifier element 15. In order to obtain the adapted rotational speed setpoint value $n_{adapt}$, the signal is also subjected to a gradient correction 16 and is limited in a value limitation 17.

Figure 4:
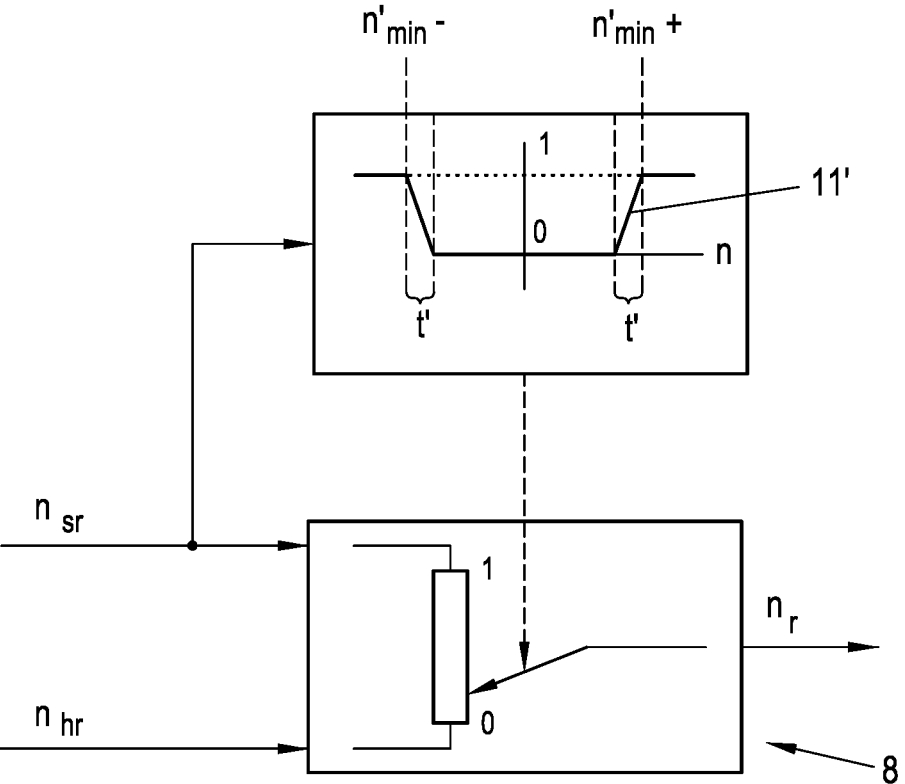
FIG. 4 is a block diagram of an actual value switching element according to a further embodiment of the control system according to the invention.

FIG. 4 is a detailed view of an actual value switching element 8 according to an alternative embodiment of the invention. The actual value switching element 8 shown in FIG. 4 can be used in addition to the control system described above or, optionally, also "on its own," i.e. in conjunction with a conventional control system. The functionality of the actual value switching element 8 is based on the concept of using a high-resolution measurement signal as the rotational speed feedback variable $n_r$ at low speeds, which prevents the problems of the measurement signals normally used, which originate from low-resolution measuring systems. Nevertheless, the advantages offered by these low-resolution measuring systems in higher rotational speed ranges should still be usable.

The actual value switching element 8 has two input values, each of which originates from a measuring device, for example the sensor arrangement 9, and an output value which is fed back into the control system as a rotational speed feedback variable $n_r$. The first input value is a general rotational speed measurement value $n_{sr}$ which originates, for example, from a conventional rotational speed measuring device, for example an encoder. The general rotational speed measurement value $n_{sr}$ can originate, for example, from an encoder having a line count of 512 and the input type "1-edge evaluation". At low rotational speeds, the time intervals between the individual measurement points naturally increase and can ultimately lead to problems with regard to the control quality. For example, such an encoder generates less than 9 pulses per second at a rotational speed of 1 rpm (this corresponds to an angle that increases or decreases at 6°/s). If the absolute value of the rotational speed is below a minimum rotational speed $n'_{min}$, the actual value switching element 8 therefore switches from the general rotational speed measurement value $n_{sr}$ to a high-resolution rotational speed measurement value $n_{hr}$, which originates from a high-resolution measurement sensor. This is the second input value of the actual value switching element 8.

The high-resolution rotational speed measurement value $n_{hr}$ can be obtained, for example, by rotational speed measuring systems which provide a high-resolution signal, for example a signal having a frequency of 100 kHz or more, even at a rotational speed of 0 rpm. Examples of such high-resolution speed measurement systems include an HMCR16 rotary encoder together with an HEAG-158 or HMCP 16A signal splitter, which are available from Baumer-Hubner. Although such sensors have the advantage that they produce a correct measured value even at very low rotational speeds, they can no longer be used above a certain maximum rotational speed because the values become imprecise. Switching between the high-resolution speed measurement value $n_{hr}$ and the general rotational speed measurement value $n_{sr}$ takes place in a rotational speed range in which the reliable working ranges of the two sensors overlap, such that, when switching at the minimum rotational speed $n'_{min}$, the two values, i.e. the general rotational speed measurement value $n_{sr}$ and the high-resolution rotational speed measurement value $n_{hr}$, match. This prevents jumps in the value of the rotational speed feedback variable $n_r$ when switching. In addition, as already described in connection with the setpoint value switching element 4, the switching process can take place with a ramp-like transition phase t', in which the value for the rotational speed feedback variable $n_r$ is created as a linear combination of the high-resolution rotational speed measurement value $n_{hr}$ and the general rotational speed measurement value $n_{sr}$.

The minimum rotational speed $n'_{min}$ used by the actual value switching element 8 can match the minimum rotational speed $n_{min}$ used by the setpoint value switching element 4 (if these two components are used together in a conntrol system), but the values can also differ. In the representation in the drawings, the same absolute value is used in each case for the positive minimum rotational speed $n_{min}^+$ or $n'_{min}^+$ and the negative minimum rotational speed $n_{min}^-$ or $n'_{min}^-$. However, this is not a mandatory requirement and these values can also differ from one another. The ramp-like transitions shown in the drawings illustrate a preferred embodiment due to the simple implementation possibilities; however, it is clear that other types of transitions or switching characteristic curves can also be used, for example to implement a stepped switching or a curved switching without points of discontinuity, if this is advantageous.

Figure 5:
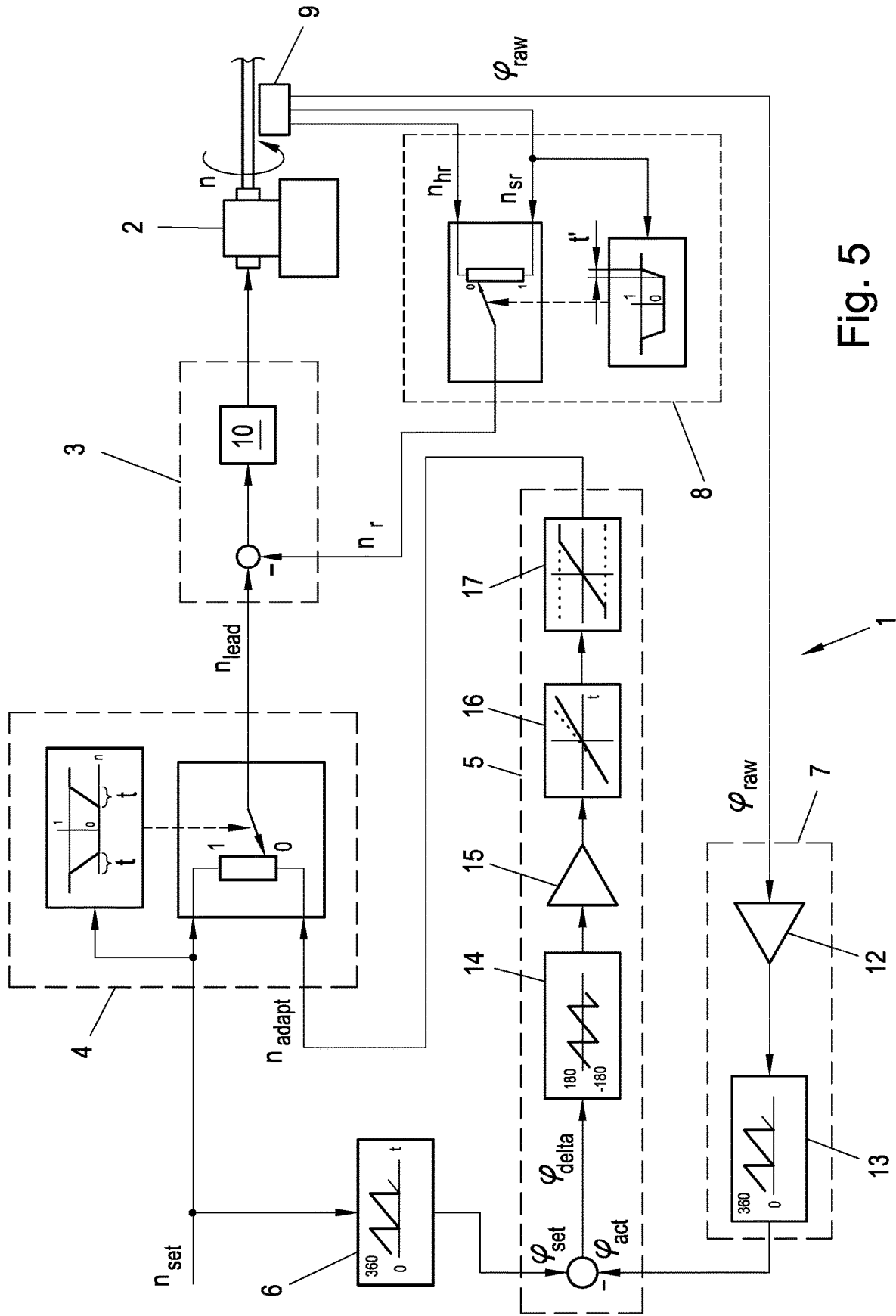
FIG. 5 is a schematic view of a control arrangement according to a second embodiment.

FIG. 5 shows a control arrangement 1 in which all of the variants described above are implemented together. The sensor arrangement 9 in this case comprises a plurality of sensors and generates a general rotational speed measurement value $n_{sr}$, a high-resolution rotational speed measurement value $n_{hr}$ and a rotation angle raw signal $\varphi_{raw}$ in order to provide these values to the actual value switching element 8 and the angle signal processing element 7.

VARIABLES rotational speed n  
rotational speed setpoint value $n_{set}$  
rotational speed reference variable $n_{lead}$  
adapted rotational speed setpoint value $n_{adapt}$  
rotational speed feedback variable $n_r$  
general rotational speed measurement value $n_{sr}$  
high-resolution rotational speed measurement value $n_{hr}$  
to minimum rotational speed $n_{min}$  
rotation angle actual value $\varphi_{act}$  
rotation angle setpoint value $\varphi_{set}$  
rotation angle raw signal $\varphi_{raw}$  
rotation angle difference $\varphi_{delta}$

REFERENCE SIGNS control arrangement 1
load machine 2
controller 3
setpoint value switching element 4
adapting element 5
integrating element 6
angle signal processing element 7
actual value switching element 8
sensor arrangement 9
control element 10
switching characteristic curve 11, 11'
scaling element 12
standardizing element 13
second standardizing element 14
amplifier element 15
gradient correction 16
value limitation 17
transition phase t, t'

The invention claimed is:

1. A method for controlling a rotational speed of a load machine on a test bench, the load machine being connected to a test object via a shaft, including the following steps:

measuring the rotational speed by means of a sensor arrangement, the measured rotational speed being fed back to a controller as a rotational speed feedback variable;

determining, in the controller, a deviation of the rotational speed feedback variable from a rotational speed reference variable;

supplying the deviation of the rotational speed feedback variable as a control difference to a control element which generates a manipulated variable for the load machine in accordance with a defined control strategy;

generating the rotational speed reference variable for the controller from a rotational speed setpoint value;

determining an adapted rotational speed setpoint value which considers a rotation angle actual value and a rotation angle setpoint value determined on the basis of the rotational speed setpoint value;

switching the rotational speed reference variable between the rotational speed setpoint value and the adapted rotational speed setpoint value as a function of the rotational speed feedback variable to control the rotational speed of the load machine.

2. The method according to claim 1, characterized in that the switching is carried out according to a switching characteristic curve including a transition phase, the rotational speed reference variable corresponding to a linear combination of the rotational speed setpoint value and the adapted rotational speed setpoint value in the transition phase.

3. The method according to claim 1, characterized in that the adapted rotational speed setpoint value is determined from a deviation of the rotation angle actual value from the rotation angle setpoint value.

4. The method according to claim 1, characterized in that the rotation angle setpoint value is determined as an integrated and normalized value from the rotational speed setpoint value.

5. The method according to claim 1, characterized in that the rotation angle actual value is determined as a scaled and normalized value from a rotation angle raw signal.

6. The method according to claim 1, characterized in that a rotational speed feedback variable of the control system is switched between a general rotational speed measurement value and a high-resolution rotational speed measurement value as a function of the rotational speed.

7. The method according to claim 6, characterized in that the switching is carried out according to a switching characteristic curve including a transition phase, the rotational speed feedback variable corresponding to a linear combination of the general rotational speed measurement value and the high-resolution rotational speed measurement value in the transition phase.

8. The method of claim 2, wherein the transition phase of the switching characteristic curve is a ramp-like transition phase.

9. The method of claim 7, wherein the transition phase of the switching characteristic curve is a ramp-like transition phase.

10. A control arrangement for controlling the rotational speed of a load machine on a test bench, the load machine being connected to a test bench via a shaft, the control arrangement comprising: a sensor arrangement configured and arranged to measure the rotational speed the measured rotational speed being fed back to a controller as a rotational speed feedback variable;

the controller configured and arranged to determine a deviation of the rotational speed feedback variable from a rotational speed reference variable and supply the deviation of the rotational speed feedback variable as a control difference to a control element which generates a manipulated variable for the load machine in accordance with a defined control strategy;

an integrating element configured and arranged to determine a rotation angle setpoint value from a rotational speed setpoint value;

an adapting element configured and arranged to utilize a rotation angle actual value and the rotation angle setpoint value to determine an adapted rotational speed setpoint value;

and a setpoint value switching element configured and arranged to switch a rotational speed reference variable between the rotational speed setpoint value and the adapted rotational speed setpoint value as a function of the rotational speed to control the rotational speed feedback variable of the load machine.

11. The control arrangement according to claim 10, characterized in that the setpoint value switching element is further configured and arranged to carry out the switching process according to a switching characteristic curve, in which the rotational speed reference variable is determined as a linear combination of the rotational speed setpoint value and the adapted rotational speed setpoint value.

12. The control arrangement according to claim 10, wherein the adapting element is configured and arranged to determine the adapted rotational speed setpoint value from a deviation of the rotation angle actual value from a rotation angle setpoint value.

13. The control arrangement according to claim 10, wherein the integrating element is configured and arranged to determine the rotation angle setpoint value as an integrated and normalized value from the rotational speed setpoint value.

14. The control arrangement according to claim 10, further including an angle signal processing element configured and arranged to determine the rotation angle actual value as a scaled and normalized value from a rotation angle raw signal.

15. The control arrangement according to claim 10, characterized in that the control arrangement further includes an actual value switching element configured and arranged to switch a rotational speed feedback variable of the control system between a general rotational speed measurement value and a high-resolution rotational speed measurement value as a function of the rotational speed.

16. The control arrangement according to claim 15, characterized in that the actual value switching element is configured and arranged to carry out the switching process according to a switching characteristic curve in which the rotational speed feedback variable is determined as a linear combination of the general rotational speed measurement value and the high-resolution rotational speed measurement value.

17. The control arrangement of claim 11, wherein the switching characteristic curve includes a preferably ramp-like transition phase.

18. The control arrangement of claim 16, wherein the switching characteristic curve includes a preferably ramp-like transition phase.

* * * * *